United States Patent
Pavlov et al.

(10) Patent No.: US 9,569,328 B2
(45) Date of Patent: *Feb. 14, 2017

(54) MANAGING APPLICATION LOG LEVELS IN CLOUD ENVIRONMENT

(71) Applicant: SAP SE, Walldorf (DE)

(72) Inventors: Vladimir Pavlov, Sofia (BG); Hristo Kostov, Sofia (BG); Hristo Iliev, Sofia (BG); Petar Zhechev, Sofia (BG); Verzhiniya Noeva, Sofia (BG)

(73) Assignee: SAP SE, Walldorf (DE)

( * ) Notice: Subject to any disclaimer, the term of this patent is extended or adjusted under 35 U.S.C. 154(b) by 541 days.

This patent is subject to a terminal disclaimer.

(21) Appl. No.: 13/688,266

(22) Filed: Nov. 29, 2012

(65) Prior Publication Data

US 2014/0149576 A1 May 29, 2014

(51) Int. Cl.
*G06F 15/173* (2006.01)
*G06F 11/30* (2006.01)
*H04L 12/24* (2006.01)
*G06F 11/07* (2006.01)

(52) U.S. Cl.
CPC ......... *G06F 11/302* (2013.01); *G06F 11/0709* (2013.01); *G06F 11/0718* (2013.01); *G06F 11/0748* (2013.01); *G06F 11/0781* (2013.01); *H04L 41/0896* (2013.01)

(58) Field of Classification Search
CPC ................ H04L 41/0896; G06F 17/30185
USPC ................................ 709/224, 223
See application file for complete search history.

(56) References Cited

U.S. PATENT DOCUMENTS

| | | | |
|---|---|---|---|
| 2009/0240698 A1* | 9/2009 | Shukla | G06F 17/30286 |
| 2010/0115614 A1* | 5/2010 | Barile | G06F 21/552 726/22 |
| 2010/0223378 A1* | 9/2010 | Wei | H04L 41/0896 709/224 |
| 2012/0246303 A1* | 9/2012 | Petersen | G06F 17/30185 709/224 |
| 2013/0179450 A1* | 7/2013 | Chitiveli | G06F 21/6218 707/737 |
| 2013/0298183 A1* | 11/2013 | McGrath | G06F 9/455 726/1 |
| 2014/0059226 A1* | 2/2014 | Messerli | G06F 9/5072 709/226 |

\* cited by examiner

*Primary Examiner* — Dustin Nguyen
*Assistant Examiner* — Joel Mesa

(57) ABSTRACT

Applications and their application components run on a cloud platform and an underlying cloud runtime infrastructure. The cloud platform provides a service that exposes an interface to remotely change log levels of logger objects defined in application components. The application logs are generated and stored for the application components on the cloud runtime infrastructure of the cloud platform. Log levels affect the content stored in the application logs. The exposed interface is instantiated to process remote requests for managing application logs and log levels for a specified application component. The application component is deployed on the cloud platform. The requested change in the log levels is performed based on the implementation of the interface. The change in the log levels is performed in the configuration data on the cloud runtime infrastructure provided by the cloud platform.

14 Claims, 7 Drawing Sheets

600 ──▶

Console Client    602

Usage: neo [command] [command arguments]
C:\neo-sdk-1.5.2\tools\bin>neo
Available commands:

620
```
..........
--- deploy ---
  list-applications   Lists applications
  list-components     Lists components
  .......
--- logging ---
  get-log         Downloads log file
  list-loggers    List all application loggers
  list-logs       List all log files of the application
  set-log-level   Set log level for a logger
........
```

Command arguments:

630
```
........
  -p, -password, --password        Password for your user
  -c, -component, --component      Component
  properties file                  All command arguments can be
                              supplied as properties file
  -a, -account, --account          Account
  -u, -user, --user                User of the platform
  .......
  -h, -host, --host                Platform host
  -b, -application, --application  Application
.........
```

610
C:\neo-sdk-1.5.2\tools\bin>neo list-loggers -a sap -b logcmd -u i012345 -h netweaver.ondemand.com Password for your SDN user:
.....

[list-loggers] operation is successful.

Level   Logger

635
```
ERROR   /
ERROR   /Applications
...
ERROR   com.mycompany.superapp.ui.Utils
....
ERROR
com.sap.core.connectivity.httpdestination.client.DefaultHttpClientExtender
ERROR
com.sap.core.connectivity.httpdestination.client.RequestDirectorExtender
...
```

640
C:\neo-sdk-1.5.2\tools\bin>neo set-log-level -a sap -b logcmd -u i012345 -h netweaver.ondemand.com
-g com.mycompany.superapp.ui.Utils -l INFO

FIG. 6

MANAGING APPLICATION LOG LEVELS IN CLOUD ENVIRONMENT

BACKGROUND

Cloud computing refers to the hardware, system software, and applications delivered as services over the Internet. Cloud computing can be defined as data centers plus a layer of system software services designed to support creating and scalable deployment of application services. The Software-as-a-Service (SaaS) model represents applications that are accessible from various client devices through a thin client interface such as a web browser. Platform-as-a-Service (PaaS) is another category of cloud computing solutions that gives developers the tools to build and host web applications. Another level of cloud-computing solution is Infrastructure-as-a-Service (IaaS), which offers web-based access to storage and computing power. The consumer does not need to manage or control the underlying cloud infrastructure but has control over the operating system, storage, and deployed applications. To deliver highly available and flexible services (i.e., computation as a service), and owing to the maturity of virtual technology, Virtual Machines (VMs) are used as a standard for object deployment in the cloud. When an application is built on top of a PaaS offering, the application developers that maintain the application need access to the underlying infrastructure. Direct access to the underlying infrastructure in a PaaS environment is usually given to a defined number of users, such as platform operators. Monitoring systems help administrators to identify resource bottlenecks or problems and take the required action.

During the development phase, it is a common practice to insert logging statements within the code to produce informative logs at runtime that can be helpful for troubleshooting or for analysis purposes. Logging is a process of creating and storing permanent records of events for a particular system or software application that can be reviewed, printed, and analyzed. These records can contain short messages, the source of the records, timestamps of the events, log levels specifying the importance of the records, etc. Log messages can include a detailed sequence of statements that describe the events happening during an operation as they are executed. Logger objects may have predefined levels that specify the granularity that will be applied when logging messages in log files. A logging configuration can be defined for a particular software application or a component. The logging configuration may define the log levels that will be applied, while the software application or component is running.

Since version 1.4, Java® itself comes with the capable logging package, java.util.logging (Java® Logging framework), which enables a Java® Virtual Machine (JVM)-wide logging configuration shared by all applications running in the JVM. The Java® logging framework is a logging package for the Java® Platform that defines some log levels, e.g., fatal, error, warning, info, debug, trace, others. Based on the log level and the events that occur during the execution of the application, log messages are generated and stored as logged data (e.g. in log files). Log messages can be used not only by application developers, but also by the system administrators that identify problems in the system operations.

Logging relevant application details at runtime is a practice that has been followed since the early days of programming It is essential to keep logs during the whole execution of a given software application or a system. Log messages are very helpful during the maintenance process of an application. The log levels defined for logger objects denote the level of importance or relevance of a certain message. This is also applicable to SaaS solutions. To retrieve the logged data for an application deployed on a PaaS solution, the underlying cloud infrastructure needs to be accessed. When an event has occurred and troubleshooted is necessary, the log messages can be reviewed. If the information received from the log messages is not enough for the troubleshooting tasks, the log level for the logger object may be changed accordingly. This way, when the event occurs again, a large portion of log messages will be logged in the log file with detailed information that can help for the resolution of the issue.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 6 is an exemplary screenshot, depicting an embodiment of an environment of a console client for sending requests to an instantiated interface provided by a cloud platform.

DETAILED DESCRIPTION

Embodiments of techniques for managing application log levels in cloud environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Monitoring application servers and application components that run on top of an application server is a process that is important for on-premise and on-demand solutions. When troubleshooting problems (e.g. reported by customers), application developers need to monitor the behavior of applications and their application components during runtime to effectively manage the performance of the application. Therefore, they need access to the stored application logs and the log configuration. However, when an application is deployed on a cloud platform, the cloud runtime infrastructure may not be directly accessed by the application developer. Access to the logging information should be offered without the assistance of a platform operator. Thus, application developers should be enabled to remotely manage relevant application logs and log configuration to easily analyze the behavior of running applications. Developers should be enabled to remotely change the log levels defined for logger objects in the log configuration on the cloud platform. The log configuration can be defined on the runtime environment provided by the cloud platform provider. As a result, developers will be able to retrieve log files with different level of details and will be able to manage the logs according to their preference and development needs.

Figure 1:
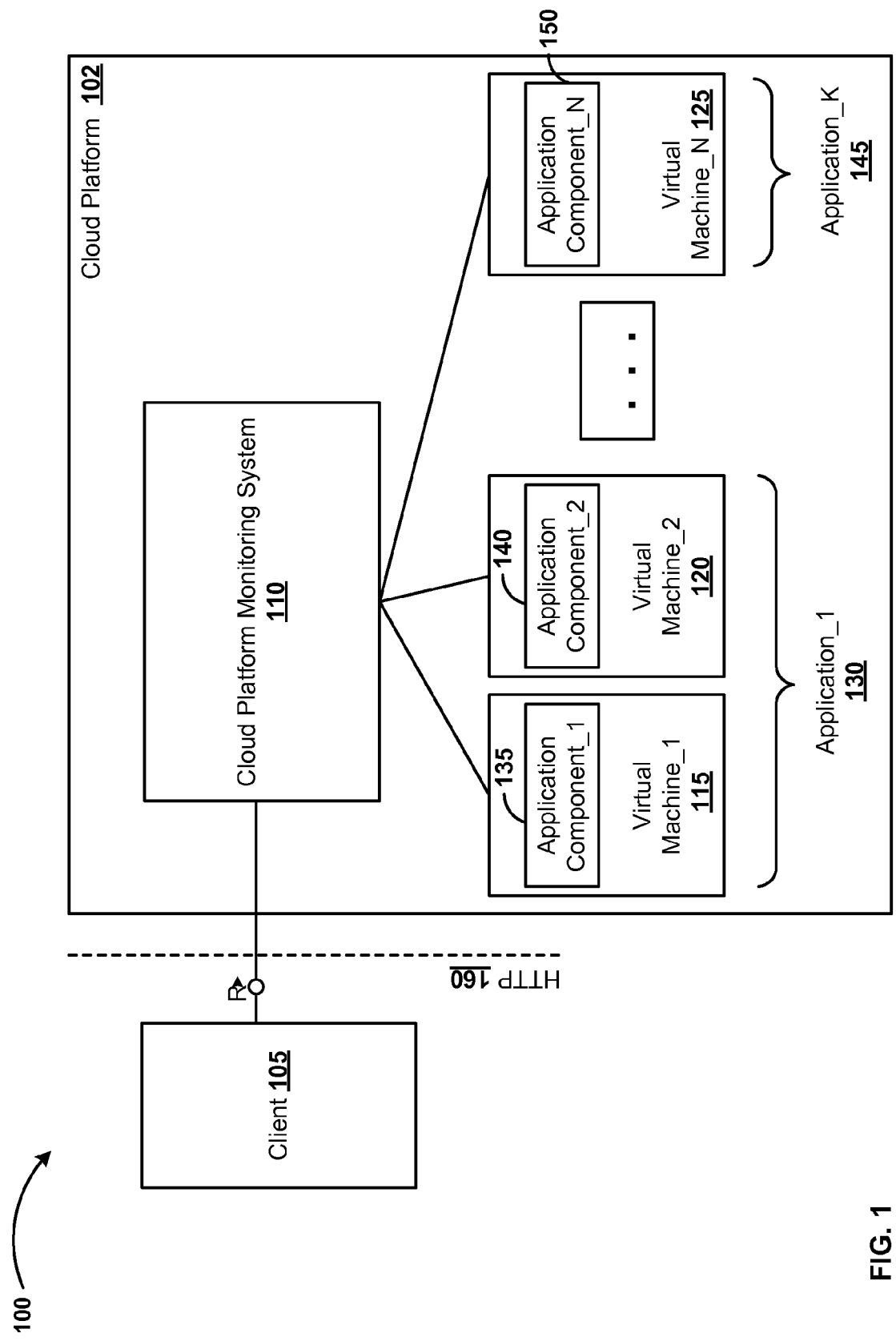
FIG. 1 is a block diagram illustrating an embodiment of an environment for remotely managing application log levels for logger objects in application components deployed on a cloud platform.

FIG. 1 is a block diagram illustrating an embodiment of an environment 100 for remotely managing application log levels for logger objects in application components deployed on a cloud platform 102. In one embodiment, the application components that are deployed on the cloud platform 102 are Application Component_1 135, Application Component_2 140, Application Component_N 150, etc. A client 105 may access a Cloud Platform Monitoring System 110 with a request to remotely change the currently defined log levels for logger objects defined in the application components deployed on the cloud platform 102. In one embodiment, the Cloud Platform Monitoring System 110 may provide a service to retrieve application logs for platform-deployed components on the cloud platform 102. In another embodiment, the Cloud Platform Monitoring System 110 may provide a service to remotely manage and change the defined log levels for logger objects in the application components. The Cloud Platform Monitoring System 110 can be associated with the runtime platform infrastructure that is used for running the application components (and software applications that include these application components) on top of the cloud platform 102.

In one embodiment, the runtime platform infrastructure may include virtual machines (VMs) that are used for running the deployed application components. In one embodiment, the VMs represent the cloud runtime infrastructure provided by the cloud platform provider to the customers. For example, customers may be development organizations that develop and provide software applications to end users. The software applications may be provided as services, when defined, deployed, and started on top of PaaS offerings, such as the cloud platform 102. The VMs can be such as Virtual Machine_1 115, Virtual Machine_2 120, Virtual Machine_N 125, etc. Different applications with their application components can be deployed and started on the VMs. For example, Application_1 130 includes two components—Application Component_1 135 and Application Component_2 140. The Application Component_1 135 and Application Component_2 140 are deployed and started on the Virtual Machine_1 115 and the Virtual Machine_2 120. Furthermore, there may be an application, such as Application_K 145, that includes only one application component—Application Component_N 150, which runs on the Virtual Machine_N 125.

The application components run on servers that are installed on the VMs. In one embodiment, the server can be an application server which may be a Java® application server for executing Java®-based applications. Application components, such as Application Component_1 135, Application Component_2 140, Application Component_N 150, can be developed in such a manner that they include logging functionality. In the programming code for the application components, logger objects may be defined. During the execution of tasks through the application components, logger objects may be used to write log messages. The servers may store the log messages in log files. The log messages that are stored may depend on the log levels that are defined for logger object in a log configuration for the application components. The log messages that are stored may also depend on the behavior of the application components, while tasks are executed through the application components. The log messages can be monitored to determine critical issues in the execution of an application component. In addition, log messages help application developers to distinguish the particular problem that is causing the issues.

When an issue appears, the stored logs with the log messages can be displayed and the performance of the software application or components can be analyzed with the assistance of the log messages to specify the problem area in the software application. If the problem area cannot be specified and resolved using the log messages that are stored, the log levels for the logger objects may be changed in the log configuration. As a result, more log messages can be generated when the problem occurs and these additional log messages may describe better the performance of the application components. The details may be helpful during the resolution steps that have to be performed. If additional data is needed for the resolution of a problem, the logging configuration can be changed. Thus, after changing the logging configuration and performing a particular task with the software application, the recorded logs will contain different amounts of log messages reflecting the new configuration. In one aspect, the performed task may be the task that was performed when the issue appeared. This way, the problem will be reproduced and new amount of log messages will be stored based on the changed configuration of the log levels.

In one embodiment, the request sent from the client 105 can specify which application components are monitored and can request provision of the stored logged data and the defined logger objects for the monitored application components. For example, the client 105 can be a web application for providing information about deployed application components on the cloud platform 102. The client 105 may be provided as a part of the cloud platform 102. Additionally, the client 105 may provide remote management capabilities for the logged data, for example, changing the log levels defined for logger objects in the application components. Another example of the client 105 can be an Integrated Development Environment (IDE) that provides the option of a software developer to access the Cloud Platform Monitoring System 110 and deploy application components on top of the provided runtime infrastructure. The IDE can be the Eclipse® development environment which could be used to develop applications in various programming languages, such as, but not limited to, Java®, Perl®, C®, C++®, PHP®, etc. Yet another example of the client 105 may be a command-line console client into which a user may enter commands. The command-line console client can be designed to communicate with the Cloud Platform Monitoring System 110. In one embodiment, the cloud platform 102 can provide platform accounts to be used by clients, such as the client 105. An account can be a logical entity for separation which a customer may receive and use to authenticate on the cloud platform 102. Authenticated customers can use a cloud-provided space for their own business needs and create different cloud-based applications. The cloud-provided space may be a repository or storage. One account may use one cloud-provided space for a number of applications deployed on the cloud platform.

The request from the client 105 can be received over a remote communication channel 160. For example, the remote communication channel 160 can be based on Hypertext Transfer Protocol (HTTP). The Cloud Platform Monitoring System 110 can remotely manage application log levels for requested logger objects defined in a set of application components from the application components deployed and started on VMs—Virtual Machine_1 115, Virtual Machine_2 120, Virtual Machine_N 125, and other VMs, provided by the cloud platform. In one embodiment, the execution of the application components, such as Application Component_1 135, may record log messages corresponding to defined logger objects in the programming code for the Application Component_1 135. In another embodiment, the recorded log messages may be interpreted as logged data describing the behavior of a running software component, a software application, or a software system. The logged data can be stored on a server running on a VM, such as the Virtual Machine_1 115, Virtual machine_2 120, etc. Logger objects have defined log levels in the configuration data defined for the running Application Component_1 135 on the corresponding VM—Virtual Machine_1 115. After processing a request from the client 105 to change the log levels to requested log levels defined for logger objects in application components, the Cloud Platform Monitoring System 110 makes the changes in configuration information for the application components. The change of the log levels may be accomplished in the configuration data stored for the application components on the cloud runtime infrastructure which includes Virtual Machine_1 115, Virtual Machine_2 120, Virtual Machine_N f, and other VMs, provided by the cloud platform. In one embodiment, the configuration data may be stored on an application server installed on the VMs.

Figure 2:
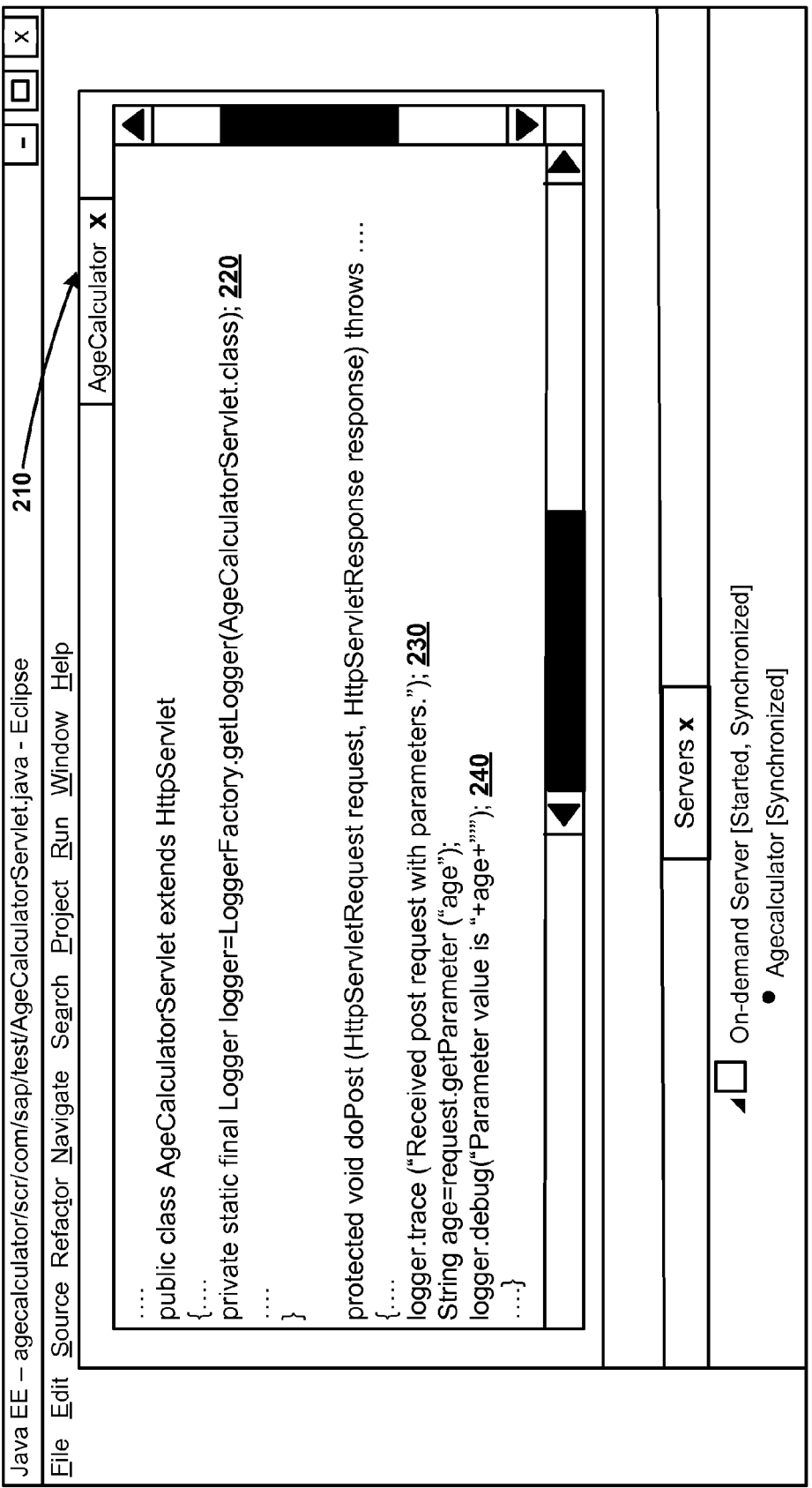
FIG. 2 is an exemplary screenshot, depicting an embodiment of a development environment of an application component that applies logging functionality.

FIG. 2 is an exemplary screenshot, depicting an embodiment of a development environment 200 of an application component that applies logging functionality. The application component represents a web application "AgeCalculator" that calculates the digits in the age of a given person. The application may run on a cloud platform, such as the cloud platform 102 in FIG. 1. Screen 210 represents part of the Java® programming code of the application "AgeCalculator" that implements Java® logging functionality. The web application may use a logger object—"logger", which is defined in line 220. The logger object is used in for the AgeCalculatorServlet.class and may be displayed with the name "AgeCalculatorServlet" in the log configuration. The logger object may record log messages in the logged data based on the defined log level for the logger object. The logged data may be stored on a cloud runtime infrastructure provided by the cloud platform, for example on an application server installed on VMs. A trace method and a debug method may be called for the logger object in line 230 and line 240 respectively. The arguments for these methods may be strings that will be stored in the logged data if an event happens in the execution of the application and a required log level is defined for the logger object "logger" in the configuration data.

The Java® Logging framework may define a number of log levels that are arranged in order according to the level of importance or relevance of a certain message stored in the logged data. For example, the increasing order of the log levels may be: all, debug, info, warn, error, fatal, off. This means that the "all" log level is with the lowest severity and means that all messages will be stored in the log data regardless of log level. Another example is log level "warn". If the log level is "warn" for a given logger object, the log messages that will be stored in the logged data will come from method calls with "warn" or higher log levels, e.g. error and fatal.

Figure 3:
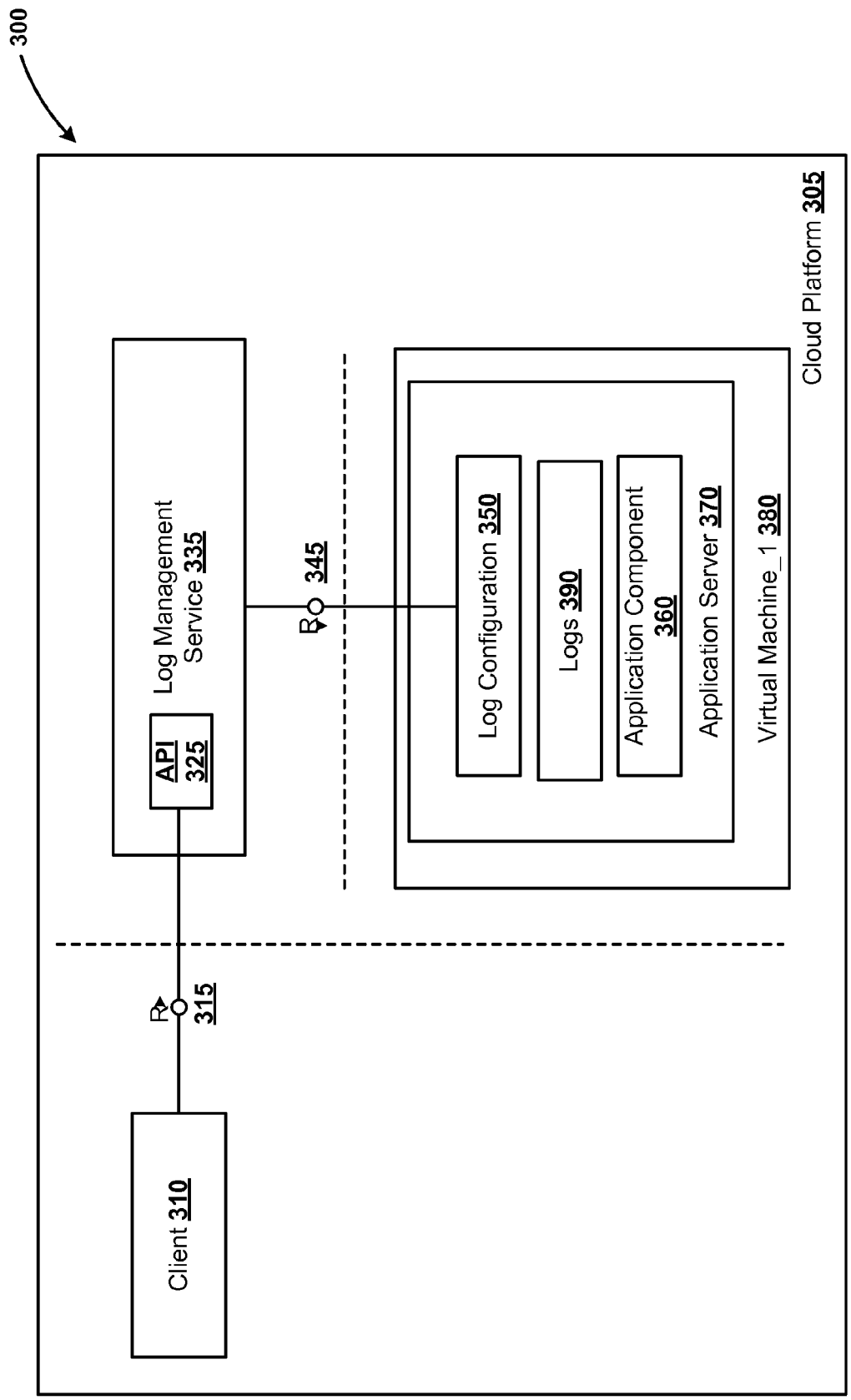
FIG. 3 is a block diagram illustrating an embodiment of an environment for remotely managing application log levels in application components using interfaces provided by a cloud platform.

FIG. 3 is a block diagram illustrating an embodiment of an environment 300 for remotely managing application log levels in application components using interfaces provided by a cloud platform 305. Application Component 360 may be deployed and started on the cloud platform 305. The Application Component 360 may be installed on an Application Server 370 on a Virtual Machine_1 380 provided by the cloud platform 305. In one embodiment, the implementation of the Application Component 360 may include logging functionality, such as logging messages for logger objects defined in the component that are stored in Logs 390. For example, Logs 390 may include application log data stored since the last start of the Application Component 360. These messages may be stored during the execution of the application that contains the component. In another embodiment, the Logs 390 may include application log data stored since the first start of the Application Component 360 on the cloud platform 305. The logged data may be configured and stored on the Application Server 370. Log Configuration 350 may define the log levels for the logger objects defined in the Application Component 360.

In one embodiment, the cloud platform 305 can provide a Log Management Service 335. The Log Management Service 335 can expose an API (Application Programming Interface) 325 which can be accessed by external units, such as a client 310, through communication channel 315. The API 325 may represent a specification that defines the communication between software components. In one embodiment, the API can provide interfaces that allow operations like listing available log files for deployed application components, listing of all logger objects for a given application component, providing the current log level of a given logger object, changing the log level of a given logger object, etc. The Log Management Service 335 may communicate with the cloud runtime infrastructure to allow the above mentioned operations that are offered from the API 325. In one embodiment, the Log Management Service 335 communicated with the Virtual Machine_1 380 through a communication channel 345. The management and monitoring of the Application Component 360 can be designed and developed using a Java® technology such as Java Management Extensions (JMX).

In one embodiment, the operations that are allowed from the API 325 may support authentication and authorization features. The Log Management Service 335 may expose the API 325 and instantiate the interfaces that are included in the API 325. The API 325 may include an interface, which can be a programming interface. In one embodiment, the API 325 may include one or more interfaces that can serve the requests from the client 310. The client 310 may request displaying of the logged data stored for a given component, for example, Application Component 360. The communication between the client 310 and the Log Management Service can be based on HTTP. Also, the client 310 may request displaying the logger objects that are defined in the programming code for the component together with the log levels that are defined for the logger objects. Therefore, to serve this request, the implementation of the interfaces may request the required information from the underlying cloud runtime infrastructure. For example, through the communication channel 345, a second call can be performed to request data regarding the logger objects and the log levels for logger objects for Application Component 360 that are stored in the Log Configuration 350. In another embodiment, the client 310 may request from the Log Management Service 335 to change the log levels for defined logger objects for a specified application component. The implementation of an interface, provided by the API 325, may use the communication channel 345 and request changing the log level for the logger object in the Log Configuration 350. In one embodiment, the change in the log levels stored in the Log Configuration 350 is accomplished during runtime. In one embodiment, the underlying cloud runtime infrastructure can be designed in such a manner that even if a VM is restarted, the last log levels defined for the logger objects for applications running on the VM can be persisted.

In one embodiment, the implementation of the interfaces provided by the API 325 exposed by the Log Management Service 335 can be based on Representational State Transfer (REST) architecture style. REST defines a set of architectural principles by which one can design a service (web service) that is concentrated on resources that are transferred over HTTP. REST principles can be applied with a wide range of clients written in different programming languages. Web services that are based on the REST architecture style (also called RESTful Web services) use HTTP method explicitly and in a way consistent with the protocol definition. There is a one-to-one mapping between "CREATE", "READ", "UPDATE", and "DELETE" operations and HTTP methods. For example, when retrieving a resource, a GET method is used. Another example is when an entity is stored on a specified place, and a PUT method is used. RESTful Web services expose directly structure-like Uniform Resource Identifiers (URIs). The Log Management Service 335 can be designed as a REST service. The exposed API (API 325) can be used for the purpose of building various clients that can present application logged data, defined logger objects in application components, defined log levels for the logger objects, etc. to end users (e.g. application developers). In addition, the API 325 may further be operable to apply changes in the log configuration. This functionality may be very useful when troubleshooting the performance of an application or an application component. In one embodiment, an end user may request from the cloud platform 305 to display logged data or to list logger objects within a web browser. In another embodiment, a web application can be developed to allow end users and application developers to request changes in the log configuration defined for applications deployed and running on a cloud platform. In another embodiment, a custom application or a mobile application may be developed in such a manner that they use the logging functionality provided by the Log Management Service 335 and the exposed API 325.

The API specification may define methods that can be used. If the API is a REST API, the REST API specification may provide description of the HTTP methods that are available and a path that can be used for a Uniform Resource Location (URL)-based request. Table 1 presents an example specification for the API 325 which is presented as a REST API. The specification defines the name of the method, the request paths that can be used, a description of the operation, and a possible HTTP response code. In the request path, an account is specified, together with the name of the application and the application component.

TABLE 1

| HTTP Method | Request Path | Description | Possible HTTP Response Codes |
|---|---|---|---|
| GET | /:account/:application/:component | Returns all logger objects for a given application component identified by /:account/:application/:component | 200, 401, 403, 404 |
| GET | /:account/:application/:component/:logger object | Returns the current log level of a given logger object within a given application component | 200, 401, 403, 404 |
| PUT | /:account/:application/:component/:logger object | Change the log level of a given logger object within a given application component | 200, 400, 401, 403, 404 |

Table 2 presents description of the used parameters in the request path. For example, a URL that is used when using the methods presented in Table 1 can be—"https://<monitoring system>/log/api/logger/<path>".

TABLE 2

| Parameter | Type | Possible Values | Description |
|---|---|---|---|
| :account | String | Valid and existing account | Name of the account for which log levels are to be managed |
| :application | String | Valid and existing application | Name of the application for which log levels are to be managed |
| :component | String | Valid and existing component | Name of the component for which log levels are to be managed |
| :logger object | String | Valid name of a logger object/location/, e.g. com.sap.core.js.conf.agent.MetaConfiguration or /Applications/Common/Failover | Name of the logger object/location/, whose log level is to be managed |

Table 3 presents a sample output result that can be returned (displayed) to the client after requesting logger objects from an application component to be displayed by using the GET method and applying it to a provided URL. The request can be made in the following form: "https://<monitoring system>/log/api/loggers/companyA/application1/web", which represents a request for account "companyA", for application "application)", and for application component "web". In one embodiment, the output may be provided in Java Script Object Notation (JSON) format. The output includes the names of the logger objects that are defined in component "web" in "application)" with their corresponding log levels.

TABLE 3

```
{
    "account":"companyA",
    "application":"application1",
    "component":"web",
    "logger objects":[
        {
            "name":"com.acme.prjmgmt.web.controller",
            "level":"ERROR"
        },
        {
            "name":"com.sap.core.alerting",
            "level":"INFO"
        }
    ]
}
```

Figure 4:
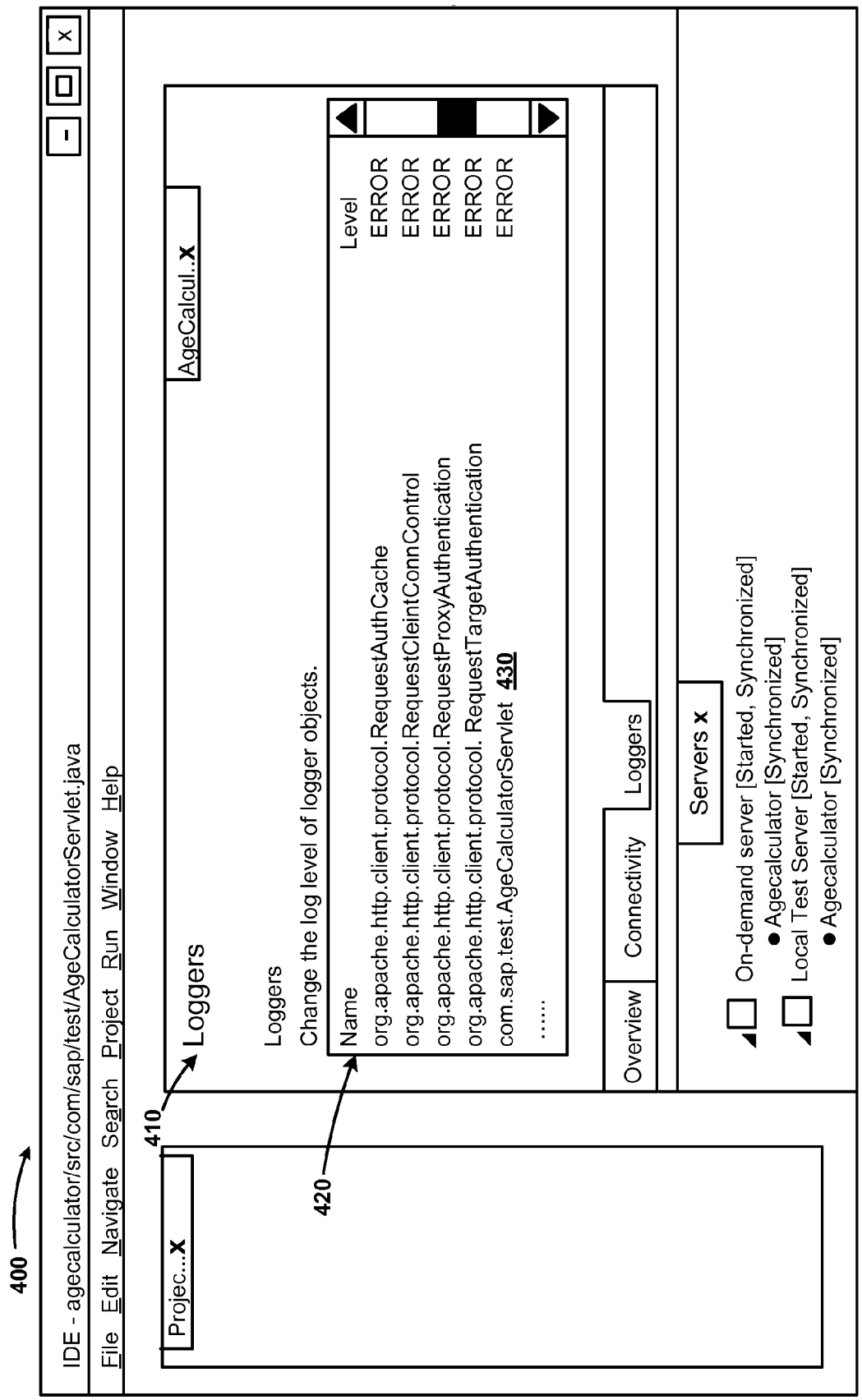
FIG. 4 is an exemplary screenshot, depicting an embodiment of an environment of a client for sending requests for changing log levels of logger objects in application components deployed on a cloud platform.

FIG. 4 is an exemplary screenshot, depicting an embodiment of an environment of a client 400 for sending requests for changing log levels of logger objects in application components deployed on a cloud platform. In one embodiment, the cloud platform can be the cloud platform 305 as depicted in FIG. 3. The client 400 may be an Integrated Development Environment (IDE). Through the IDE a request for changing the log level of a logger object can be accomplished. For example. In the IDE, a web application such as the "AgeCalculator" described in FIG. 2 can be developed. For the application, a screen 410 with all logger objects that are defined in the programming code can be displayed. They can be retrieved by calling the REST API (for example, API 325, FIG. 3). Block 420 displays a section of all the logger objects defined in the application "AgeCalculator". The log level for the logger object "com.sap.test.AgeCalculatorServlet" 430 is displayed and it is "Error". If an end user or application developer wants to change the log level, this can be accomplished from the IDE. For example, the change can be completed by using the secondary mouse button or a drop-down list of possible log levels for the logger object in Block 420. In another embodiment, change in the log levels can be achieved by using the keyboard, with a voice command, etc.

Figure 5:
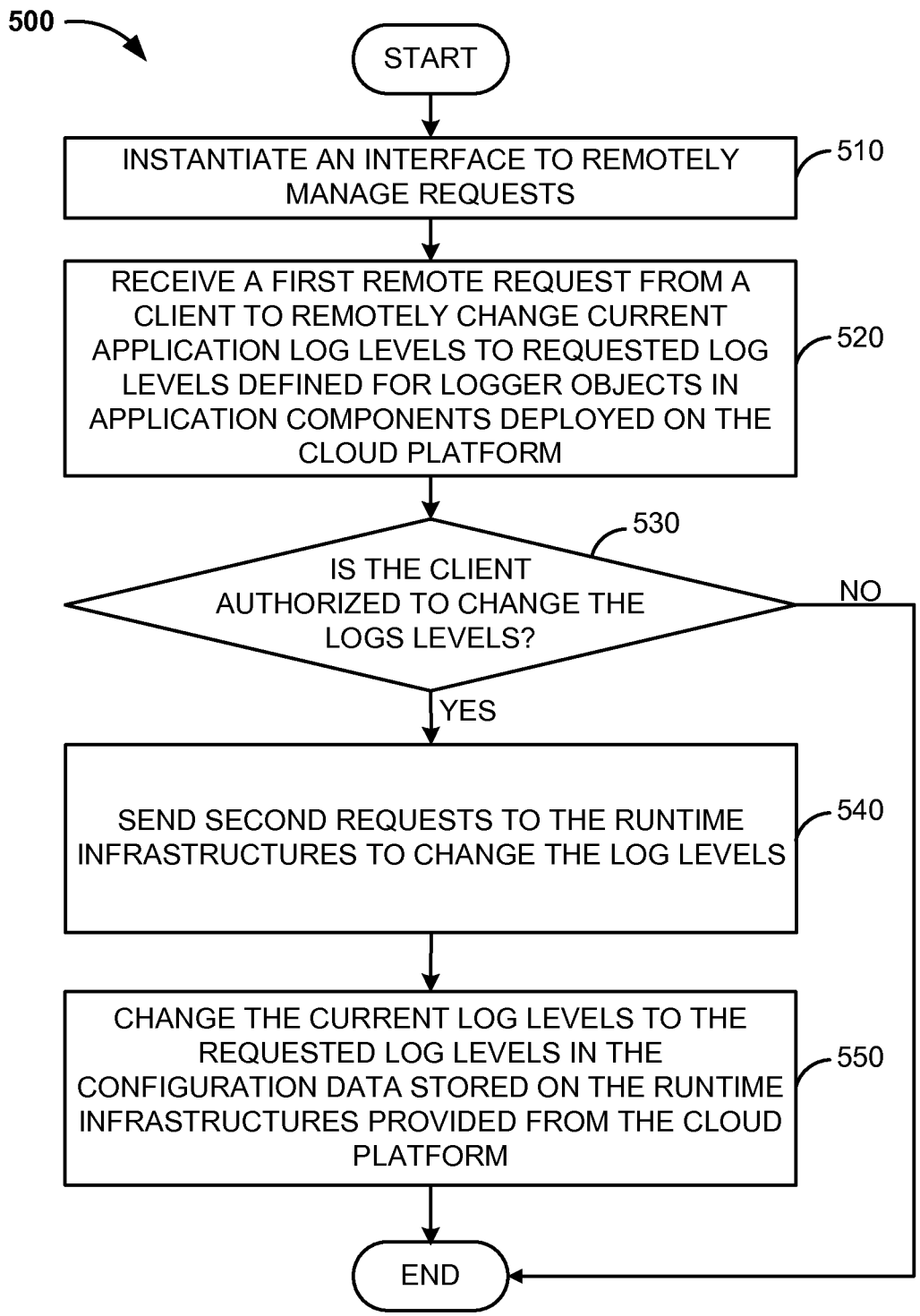
FIG. 5 is a flow diagram illustrating an embodiment of a method for remotely managing application log levels for logger objects in application components deployed on a cloud platform.

FIG. 5 is a flow diagram illustrating an embodiment of a method 500 for remotely managing application log levels for logger objects in application components deployed on a cloud platform. At process step 510, an interface is instantiated to remotely manage requests. The interface may be provided by the cloud platform. The interface may be provided as part of an API that may be exposed by a monitoring system such as the Cloud Platform Monitoring System 110 in FIG. 1. At process step 520, a first remote request is received from a client. The remote request can be received over a remote communication channel based on an application protocol, such as HTTP. The first request may specify account, application, application component, etc. In one embodiment, the first remote request may request a change in the current application log levels to requested application log levels defined for logger objects in an application component. The application component may be part of an application that is deployed and is running on a cloud platform (e.g. cloud platform 102, FIG. 1). The remote request is received by the instantiated interface. At decision block 530, it is determined whether an account that is used by the client has access rights to the logged data for the requested application components or application.

The client may use a user that is member of an account to authenticate into the cloud platform. For a given application, there can be a set of users that are allowed to perform certain operations. The implementation of the interface may further verify whether the user is authorized to perform the requested operation. If the client cannot be authenticated or is not authorized, the request for changing log levels cannot be handled by the interface. If the client is authenticated and authorized at block 530, then at process step 540, a second request is sent to the runtime infrastructure to change the log levels for the requested application component and specified logger objects. The implementation of the interface may access a location storing the requested application logs and a location storing the defined log configuration for logger objects used in the application component. In one embodiment, the log configuration can be stored on the cloud runtime infrastructure. At process step 550, the requested change of the current log levels to the requested log levels is performed and the changes are stored on the runtime infrastructure provided by the cloud platform.

FIG. 6 is an exemplary screenshot, depicting an embodiment of an environment 600 of a console client 602 for sending requests to an instantiated interface provided by a cloud platform. The console client 602 can be used when requesting a list of applications (e.g. with their names) deployed on the cloud platform, and a list of components part of the deployed application. In addition, the console client can be used to request the stored logged data. For example, the requests may include requests to list all of the log files stored for an application and to download a given log file. Also, lists of all the application logger objects that are defined in an application component can be requested. Moreover, log levels defined for logger objects can be changed with a request provided by the console client 602. A user (e.g. application developer) may use the console client 602 to request stored logged data. When the logged data is reviewed by the end user, he/she may want to change the log levels of specific logger objects in order to gain more information about the performance and behavior of the application components during runtime. The Console client 602 provides available commands 620 and commands arguments 630 to be used by a requester (e.g. user). The commands may specify a manner of defining requests. For example, the syntax in Table 4 may be used.

TABLE 4

<command name> -a <account> -b <application name> -c <component name> -u <user ID> -h <host name>

In one embodiment, the arguments that are used in a command can be given a default value, for example, if a component name is not specified in the request, it may be supposed that the requested component is "web". The end user can change the log level for a given logger object, defined in an application component part of an application, by using a command 610—"C:\neo-sdk-1.5.2\tools\bin>neo list-loggers-a sap-b logcmd-u i012345-h netweaver.ondemand.com". In one embodiment, the console client can be used as an alternative to an IDE, such as the client 400 in FIG. 4, which also provides similar functionality. The result that is accomplished when using both of these clients can be one and the same. A list of the logger objects may be provided within the console client screen, for example, the list of loggers 635.

In one embodiment, a command 640 can be used to change the log level of a logger object "com.mycompany- .superapp.ui.Utils" for an account "sap", and an application "logcmd" to a level "INFO". A user "i012345" that was used to authenticate may be checked for authorization to perform the requested operation. If the requested operation is successfully finished, the log level will be changed. In one embodiment, the application "logcmd" does not need to be stopped during the performance of the request.

In another embodiment, the application "logcmd" does not need to be restarted in order to apply the newly defined log level. After the change to a new log level—"INFO", tasks may be performed with the application, and the logged data that is stored for the application and the application components will contain log messages based on the changed log level. The stored logged data after the change may be more detailed and contain sufficient information that can be used by application developer, system administrators, etc. during the maintenance of the application.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is located remotely from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
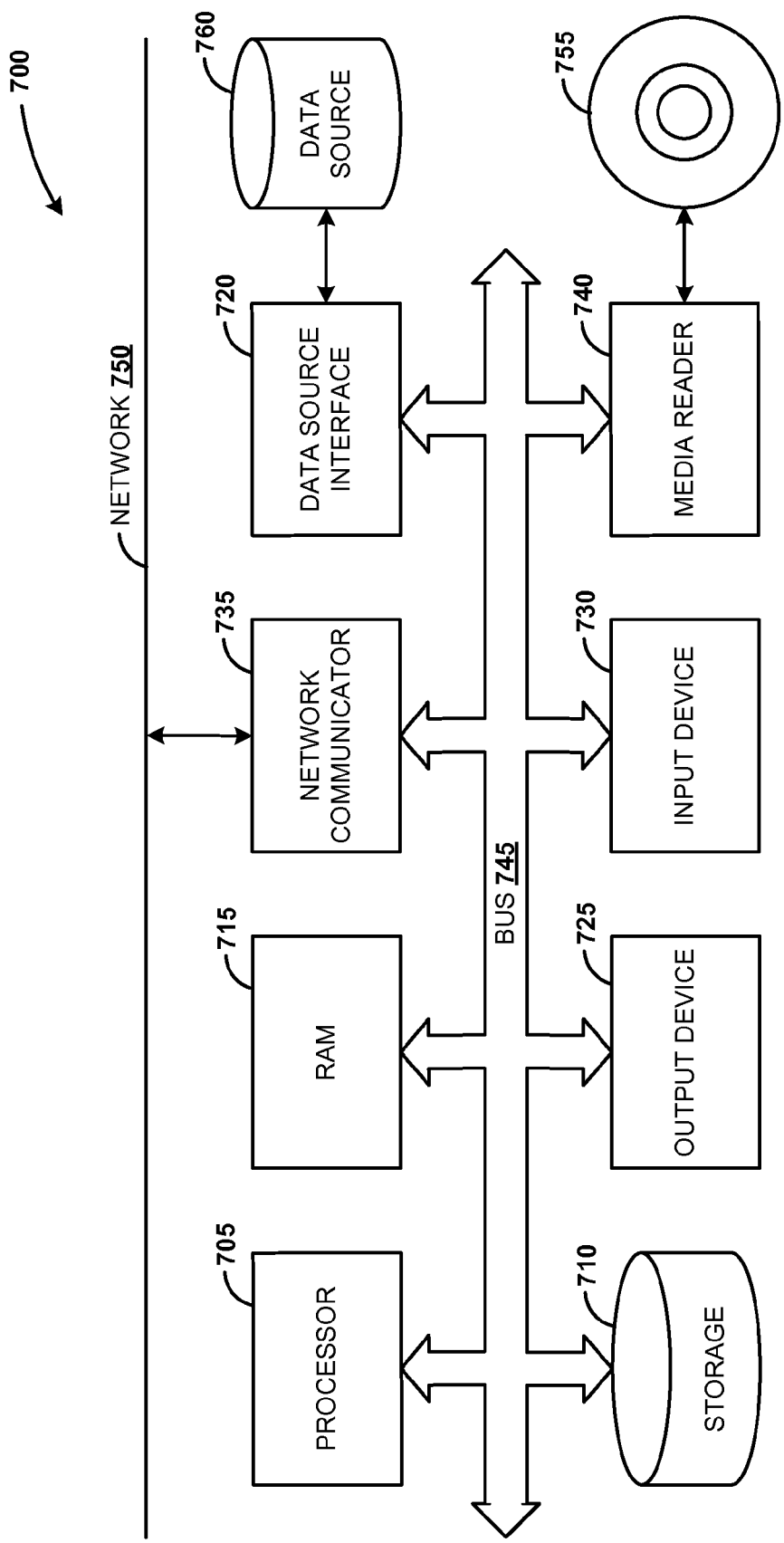
FIG. 7 is a block diagram illustrating an embodiment of a computing environment in which the techniques described for remotely managing application log levels for logger objects in application components deployed on a cloud platform can be implemented.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to remotely manage one or more current log levels defined for one or more logger objects in one or more application components running on one or more cloud runtime infrastructures provided by a cloud platform, the method comprising:
    instantiating an interface to remotely manage requests, wherein the interface is provided by the cloud platform;
    at the instantiated interface, receiving a first request from a client to remotely change the one or more current log levels to one or more requested log levels defined for the one or more logger objects in the one or more applications, wherein the one or more current log levels are defined in configuration data on the one or more cloud runtime infrastructures, and wherein log data granularity associated with the one or more requested log levels differs from log level granularity associated with the one or more current log levels; and changing, according to an implementation of the interface, the one or more current log levels in the configuration data to the one or more requested log levels during runtime of the one or more application components, wherein changing the one or more current log levels to the one or more requested log levels further comprises sending one or more second requests to the one or more cloud runtime infrastructures to change the one or more current log levels; and
    receiving a third request to retrieve new application logs generated during the runtime of the one or more application components over a remote communication channel, wherein the third request is received after a task is performed through the one or more application components, and wherein the third request is received during the runtime of the one or more application components, and wherein the one or more current log levels are changed in the configuration data.

2. The method of claim 1, wherein the first request from the client is received through a development environment provided by the cloud platform.

3. The method of claim 1, wherein the first request from the client is received over a remote communication channel based on Hypertext Transfer Protocol (HTTP).

4. The method of claim 1, wherein the instantiated interface is based on a Representation State Transfer (REST) architecture style.

5. The method of claim 1, further comprising:
    receiving a fourth request to present at least one requested logger object with at least one log level, wherein the at least one requested logger object is selected from the one or more logger objects in the one or more application components.

6. A computer system to remotely manage one or more current log levels defined for one or more logger objects in one or more application components running on one or more cloud runtime infrastructures provided by a cloud platform, the system comprising:
    a processor; and
    a memory in association with the processor storing instructions related to a log management service module operable to :
    instantiate an interface for remotely managing requests, wherein the interface is provided by the cloud platform;
    at the instantiated interface, receive a first request from a client to remotely change the one or more current log levels to one or more requested log levels defined for the one or more logger objects in the one or more applications, wherein the one or more current log levels are defined in configuration data on the one or more cloud runtime infrastructures, and wherein log data granularity associated with the one or more requested log levels differs from log level granularity associated with the one or more current log levels;
    send one or more second requests to the one or more cloud runtime infrastructures to change the one or more current log levels to the one or more requested log levels in the configuration data;
    change, according to an implementation of the interface, the one or more current log levels in the configuration data to the one or more requested log levels during runtime of the one or more application components; and
    receive a third request to retrieve new application logs generated during the runtime of the one or more application components over a remote communication channel based on Hypertext Transfer Protocol (HTTP), wherein the third request is received after a task is performed through the one or more application components, and wherein the third request is received during the runtime of the one or more application components, and wherein the one or more current log levels are changed in the configuration data.

7. The system of claim 6, wherein the first request from the client is received through a development environment provided by the cloud platform.

8. The system of claim 6, wherein the instantiated interface from the log management service module is based on a Representation State Transfer (REST) architecture style.

9. The system of claim 6, wherein the log management service module is further operable to receive a fourth request to present at least one requested logger object with at least one log level, wherein the at least one requested logger object is selected from the one or more logger objects in the one or more application components.

10. An article of manufacture to remotely manage one or more current log levels defined for one or more logger objects in one or more application components running on one or more cloud runtime infrastructures provided by a cloud platform, comprising a non-transitory computer readable storage medium including executable instructions, which when executed by a computer, cause the computer to:
    instantiate an interface to remotely manage requests, wherein the interface is provided by the cloud platform;

at the instantiated interface, receive a first request from a client to remotely change the one or more current log levels to one or more requested log levels defined for the one or more logger objects in the one or more applications, wherein the one or more current log levels are defined in configuration data on the one or more cloud runtime infrastructures, and wherein log data granularity associated with the one or more requested log levels differs from log level granularity associated with the one or more current log levels;

change, according to an implementation of the interface, the one or more current log levels in the configuration data to the one or more requested log levels during runtime of the one or more application components, wherein changing the one or more current log levels to the one or more requested log levels further comprises sending one or more second requests to the one or more cloud runtime infrastructures to change the one or more current log levels; and receive a third request to retrieve new application logs generated during the runtime of the one or more application components over a remote communication channel, wherein the third request is received after a task is performed through the one or more application components, and wherein the third request is received during the runtime of the one or more application components, and wherein the one or more current log levels are changed in the configuration data.

11. The article of manufacture of claim 10, wherein the first request from the client is received through a development environment provided by the cloud platform.

12. The article of manufacture of claim 10, wherein the first request from the client is received over a remote communication channel based on Hypertext Transfer Protocol (HTTP).

13. The article of manufacture of claim 10, wherein the instantiated interface is based on a Representation State Transfer (REST) architecture style.

14. The article of manufacture of claim 10, further comprising instructions, which when executed by a computer, cause the computer to receive a fourth request to present at least one requested logger object with at least one log level, wherein the at least one requested logger object is selected from the one or more logger objects in the one or more application components.

* * * * *